(12) United States Patent
Cui et al.

(10) Patent No.: US 12,389,298 B2
(45) Date of Patent: Aug. 12, 2025

(54) APPARATUS, SYSTEM, AND METHOD FOR CELL DETECTION AND MEASUREMENT FOR NR UNLICENSED

(71) Applicant: Apple Inc., Cupertino, CA (US)

(72) Inventors: Jie Cui, San Jose, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Wei Zeng, Saratoga, CA (US); Weidong Yang, San Diego, CA (US); Yang Tang, San Jose, CA (US); Yuchul Kim, San Jose, CA (US); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 781 days.

(21) Appl. No.: 17/770,594

(22) PCT Filed: Nov. 7, 2019

(86) PCT No.: PCT/CN2019/116314
§ 371 (c)(1),
(2) Date: Apr. 20, 2022

(87) PCT Pub. No.: WO2021/087878
PCT Pub. Date: May 14, 2021

(65) Prior Publication Data
US 2022/0417819 A1 Dec. 29, 2022

(51) Int. Cl.
*H04W 36/30* (2009.01)
*H04W 36/00* (2009.01)

(52) U.S. Cl.
CPC ..... *H04W 36/305* (2018.08); *H04W 36/0058* (2018.08)

(58) Field of Classification Search
CPC .......... H04W 36/305; H04W 36/0058; H04W 36/08; H04W 74/0808; H04W 36/0094; H04W 36/00835; H04J 11/0093
See application file for complete search history.

(56) References Cited

U.S. PATENT DOCUMENTS

2017/0280334 A1    9/2017   Chou

FOREIGN PATENT DOCUMENTS

| CN | 102668433 A | 9/2012 |
|---|---|---|
| CN | 104641683 A | 5/2015 |
| CN | 107787005 A | 3/2018 |

(Continued)

OTHER PUBLICATIONS

Extended European Search Report for EP Patent Application No. 19951249.2; 14 pages; Sep. 28, 2022.

(Continued)

*Primary Examiner* — Eric Myers
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) and/or cellular network to perform to perform cell detection and measurement, e.g., in new radio (NR) unlicensed (NR-U). The UE may determine that a threshold condition related to missed reference signal opportunities is reached. In response, the UE may modify reference signal monitoring and/or measurement.

20 Claims, 6 Drawing Sheets

(56) References Cited

FOREIGN PATENT DOCUMENTS

| CN | 108882327 A | 11/2018 |
|---|---|---|
| CN | 109923902 A | 6/2019 |

OTHER PUBLICATIONS

Ericsson "Handling LBT failure"; 3GPP TSG RAN WG2 #107bis R2-1913504; Chongqing, China; 7 pages; Oct. 14, 2019.
Spreadtrum Communications "NR-U Measurement and Mobility Consideration"; 3GPP TSG RAN WG2 Meeting #105bis R2-1903790 Xi'an, China 4 pages; Apr. 8, 2019.
Fraunhoffer HHI et al. "RRM Measurements for Mobility in NR-U"; 3GPP TSG RAN WG2 Meeting #107bis R2-1912649; Chongqing, China; 3 pages; Oct. 14, 2019.
Ericsson "RRM Requirements related to CA 1-15 for LAA"; 3GPP TSG RAN WG4 Meeting #77 R4-157883; Anaheim, USA; 5 pages; Nov. 16, 2015.
Ericsson "On initial access, RRM, mobility and RLM"; 3GPP TSG RAN WG1 Meeting #95 R1-1813459; Spokane, USA; 15 pages; Nov. 12, 2018.
International Search Report and Written Opinion for PCT/CN2019/116314; 11 pages; Jul. 28, 2020.

APPARATUS, SYSTEM, AND METHOD FOR CELL DETECTION AND MEASUREMENT FOR NR UNLICENSED

PRIORITY CLAIM

This application is a national phase entry of PCT application number PCT/CN2019/116314, entitled "Apparatus, system, and method for cell detection and measurement for NR unlicensed," filed Nov. 7, 2019, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, and more particularly to apparatuses, systems, and methods for cell detection and measurement in NR unlicensed.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, a UE may communicate in unlicensed spectrum. Listen before talk failures may occur, and may interrupt cell detection and/or measurements. Accordingly, improvements in the field may be desired.

SUMMARY

Techniques, apparatuses, systems, and methods are disclosed for a user equipment device (UE) and cellular network to perform cell detection and measurement, e.g., in new radio (NR) unlicensed (NR-U). The UE may detect that a threshold condition related to missed reference signal opportunities (e.g., a threshold number of opportunities consecutively or within a period of time, etc.) has been reached. In response, the UE may modify monitoring and measurement of reference signals of one or more cells. The UE may alert the network of the threshold condition.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
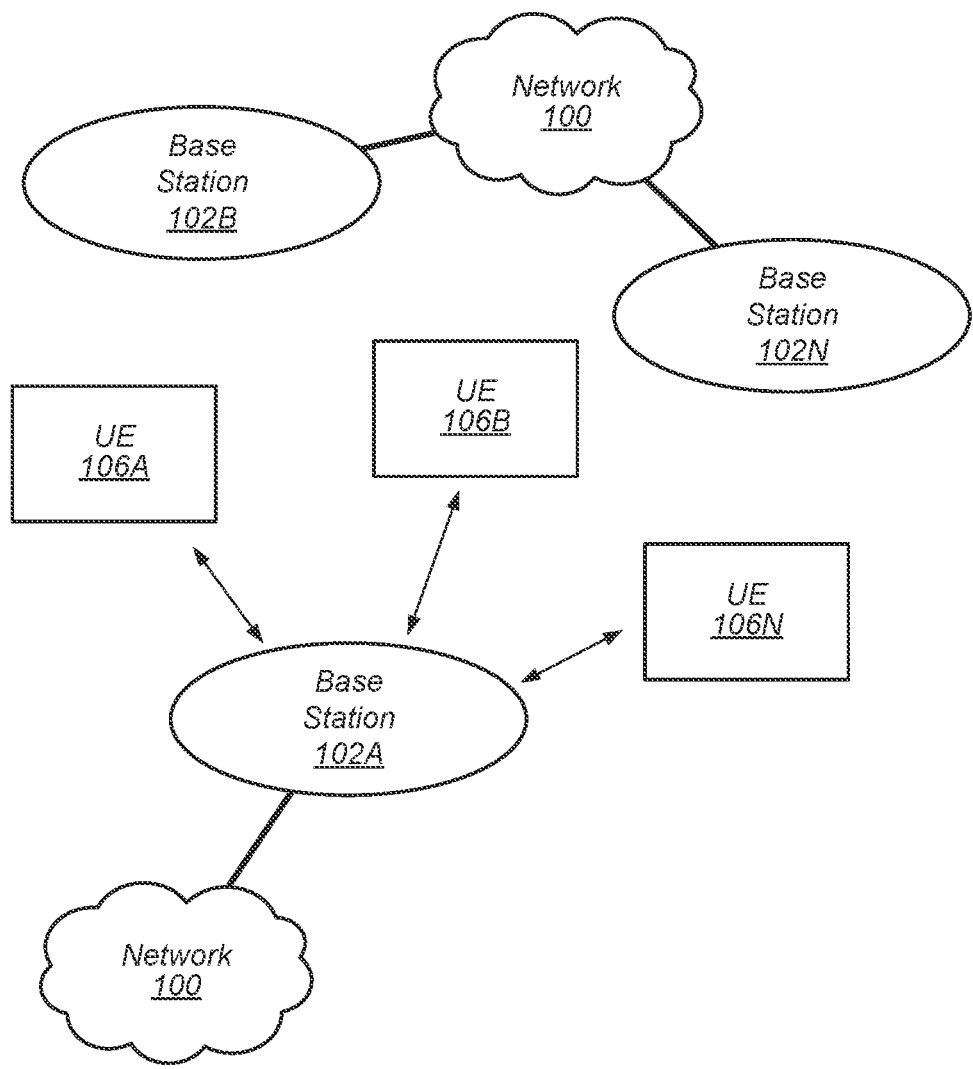
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms may be used in the present Patent Application:

UE: User Equipment
BS: Base Station
ENB: eNodeB (Base Station)
gNB: gNodeB (Base Station)
TRP: transmission—reception point (Base Station)
NR: new radio
LTE: Long Term Evolution
VoLTE: voice over LTE
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element
UL: uplink
DL: downlink
DCI: downlink control information
RS: reference signal
PLMN: Public Land Mobile Network
SMTC: SSB-based Measurement Timing configuration DMTC: Discovery-reference-signal measurement timing configuration
MG: Measurement gap
MO: Measurement object
PSS: Primary Synchronization Signal
SSS: Secondary Synchronization Signal
SSB: Synchronization Signal Block Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
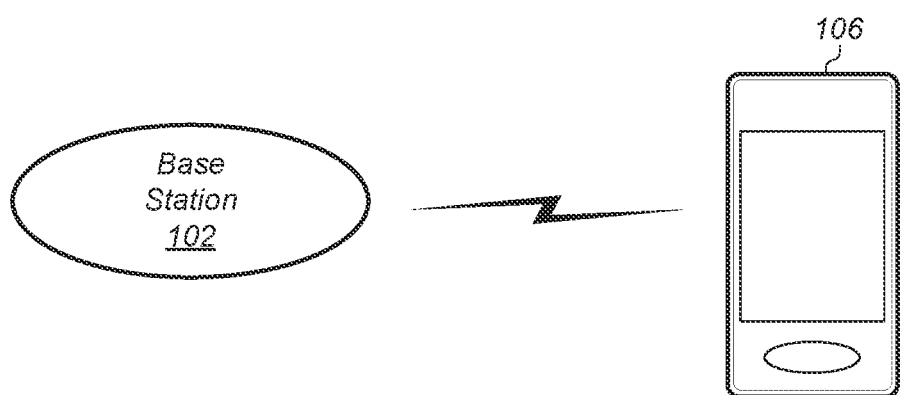
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as gNodeB' or gNB'

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

In some embodiments, UE 106 may communicate (e.g., concurrently) with multiple BS 102s.

Figure 3:
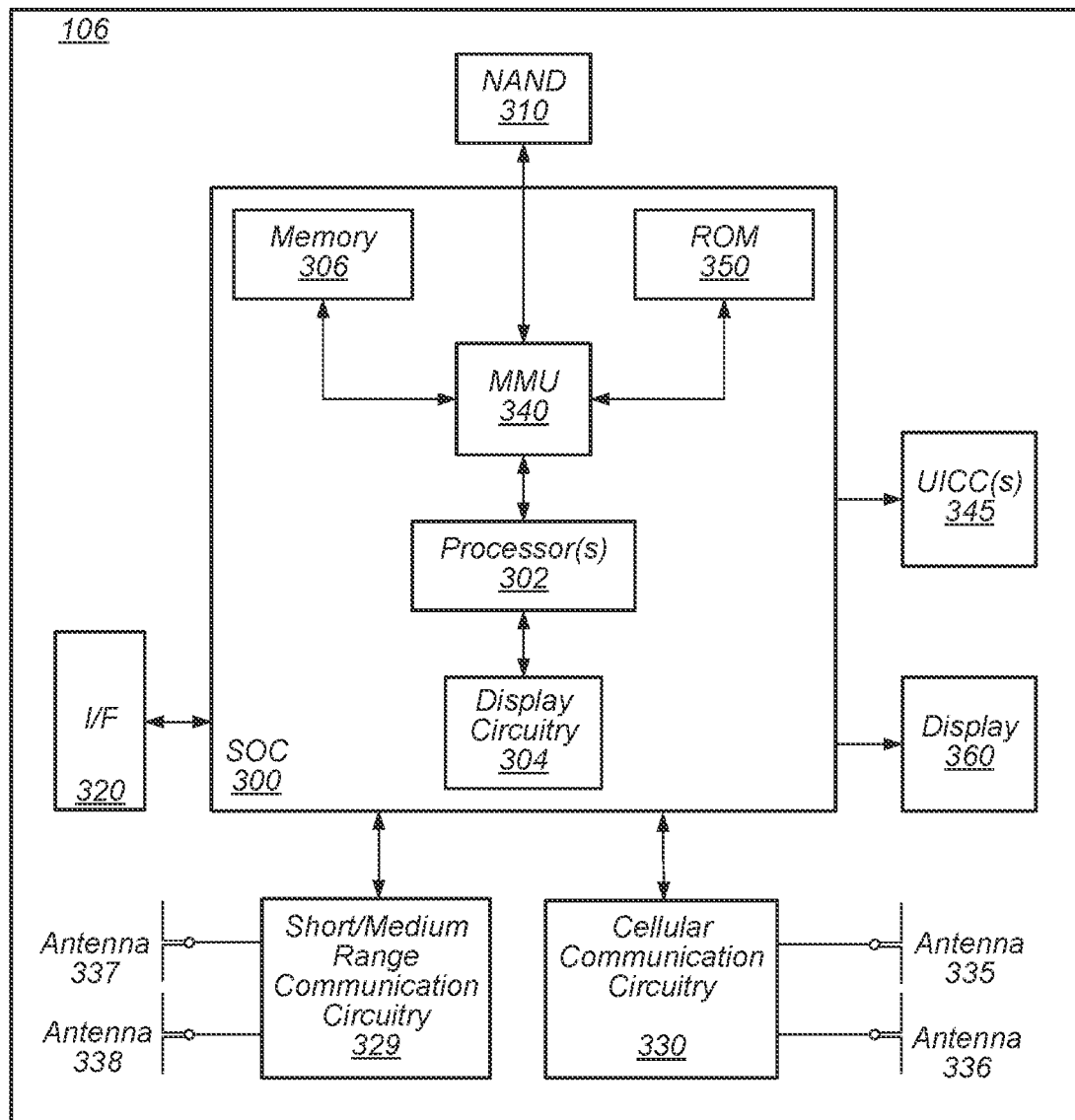
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
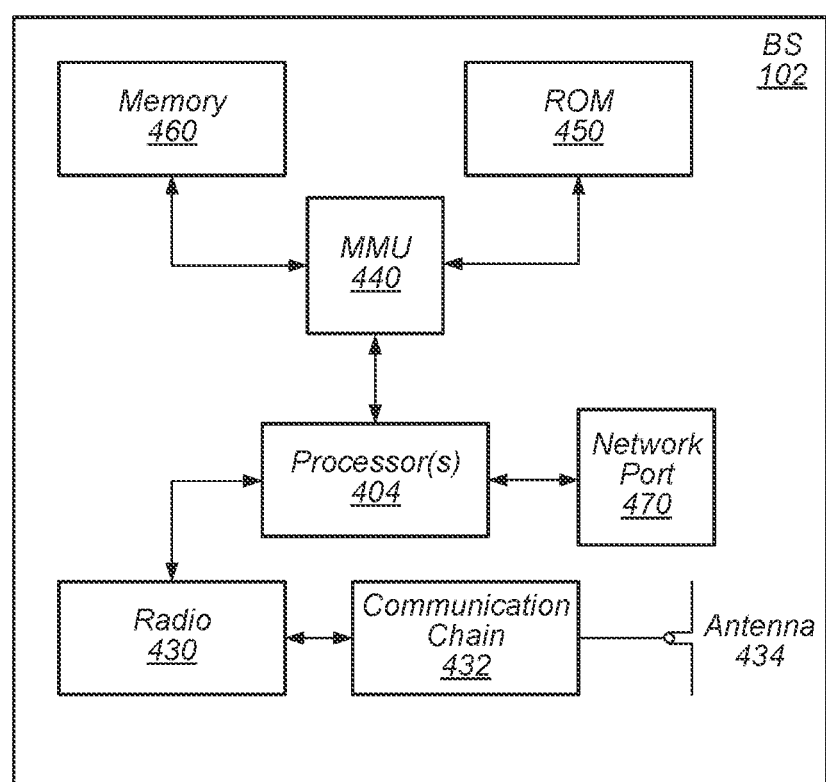
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
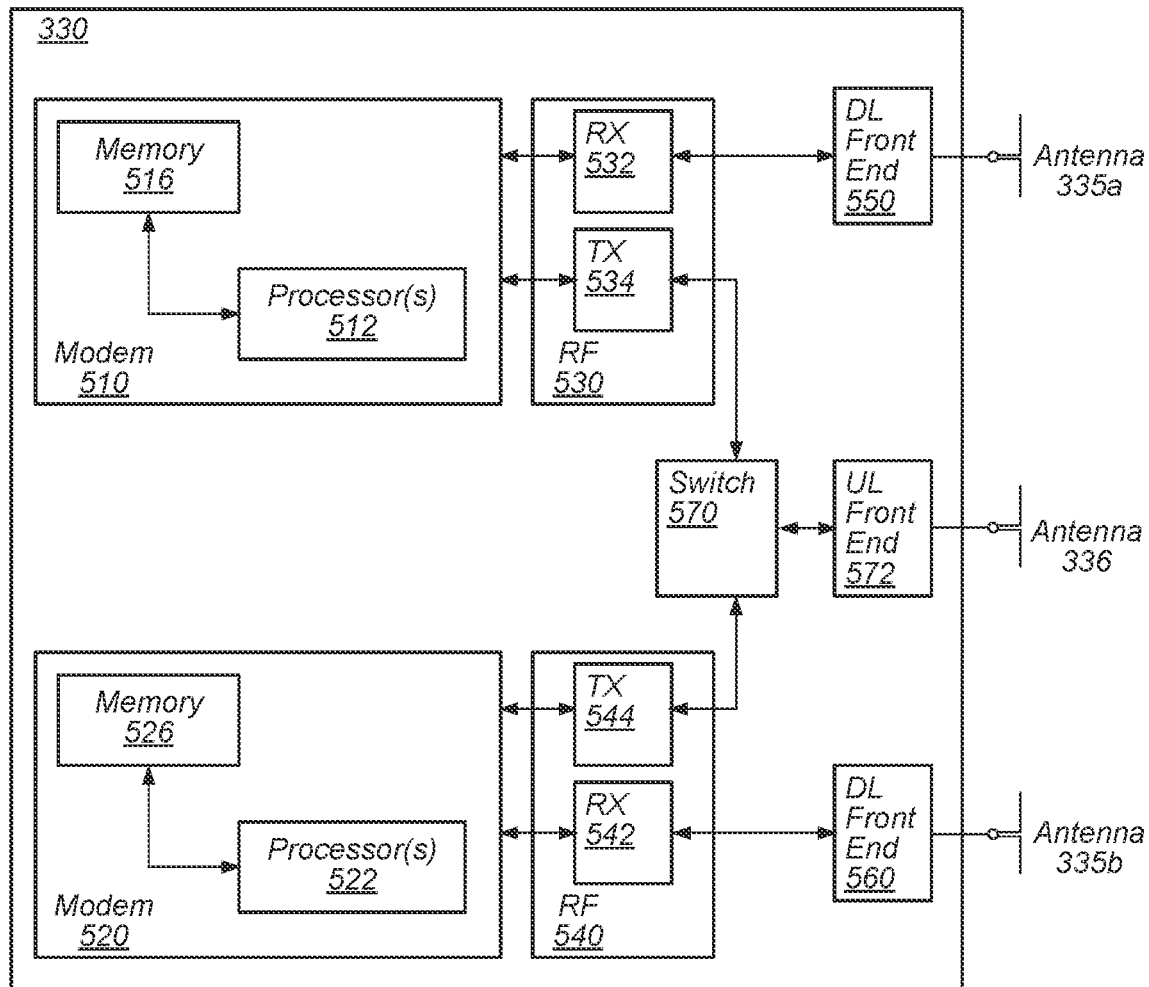
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch (e.g., and/or combiner, multiplexer, etc.) 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, modem 510 and modem 520 may be configured to transmit at the same time, receive at the same time, and/or transmit and receive at the same time. Thus, when cellular communication circuitry 330 receives instructions to transmit according to both the first RAT (e.g., as supported via modem 510) and the second RAT (e.g., as supported via modem 520), combiner 570 may be switched to a third state that allows modems 510 and 520 to transmit signals according to the first and second RATs (e.g., via a transmit circuitry 534 and 544 and UL front end 572). In other words, the modems may coordinate communication activity, and each may perform transmit and/or receive functions at any time, as desired.

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
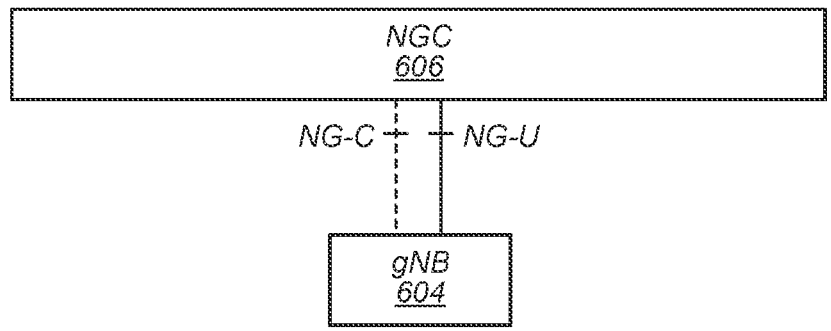
FIGS. 6 and 7 illustrate examples of a 5G NR base station (gNB), according to some embodiments.
Figure 7:
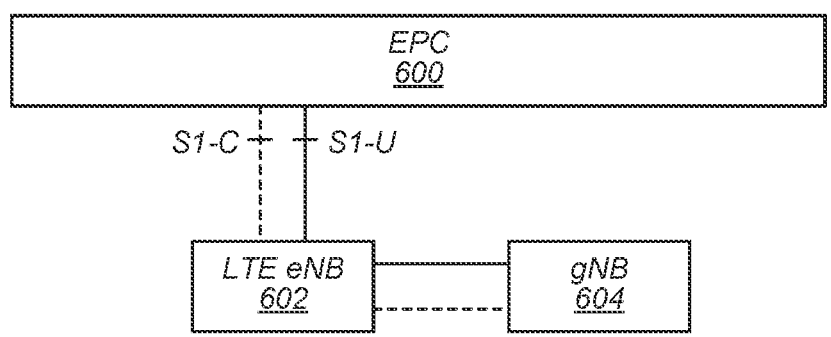

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
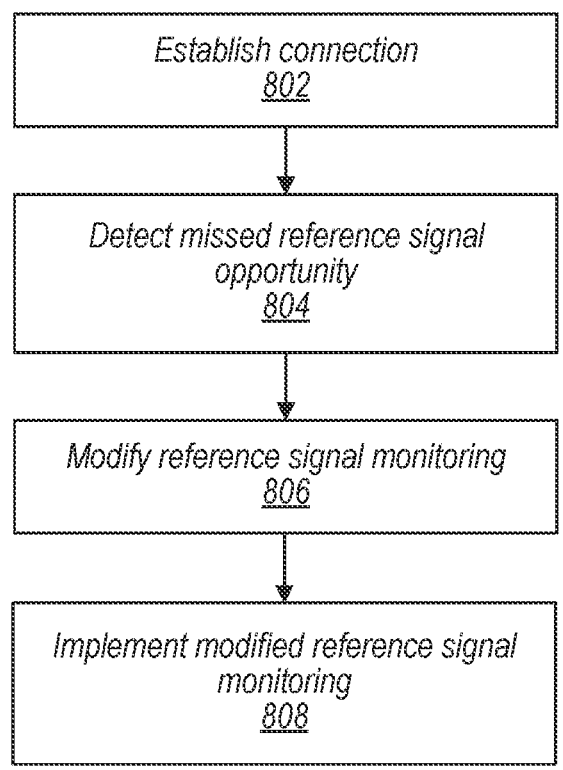
FIG. 8 illustrates an example method of cell detection and measurement in NR unlicensed, according to some embodiments.

FIG. 8—Cell Detection and Measurement

5G NR may include communications in licensed and/or unlicensed spectrum. Since NR-U (NR unlicensed) systems may introduce the LBT (listen before talk) function for network nodes (e.g., requiring a BS 102 to wait for a break/pause in other communication prior to beginning a transmission), cell detection and measurement procedures at a UE may be impacted. For example, transmission of reference signals such as primary synchronization signals (PSS), secondary synchronization signals (SSS), and/or synchronization signal blocks (SSB) may be delayed or disabled due to LBT failure, e.g., at the BS. For example, a PSS, SSS, and/or SSB may be disabled due to a transmission (e.g., of a device using the unlicensed spectrum for communications which may be separate from the NR communications, e.g., a device using WLAN) detected by the BS during the "listen" portion of an LBT procedure. In response to detecting such a transmission, the BS may determine that the unlicensed medium is busy and thus may not transmit the PSS, SSS and/or SSB on the unlicensed medium, e.g., the BS may not "talk" during the occasion for transmitting the PSS, SSS and/or SSB.

Various possibilities for cell identification, detection, and/or measurement delay are possible, according to some embodiments. These tables illustrate the time periods (T) for cell identification and measurement for different discontinuous reception (DRX) conditions. The illustrated time periods are without measurement gaps (MG). In other words, these tables may represent the delay expected when no measurement gap is used for cell detections and measurements. As used in these tables, a threshold number (such as, for example, a maximum number) of reference signals (L) missed due to LBT failure may be used to determine the time period (T). For example, L may be the number of PSS/SSS occasions not available at the UE due to LBT failure. Kp may represent a scaling factor for measurement resource allocation, e.g., with or without a measurement gap.

The first table illustrates the time for intra-frequency cell detection, e.g., detecting a neighbor cell whose SSB shares the same frequency and same numerology as serving cell SSB.

| Condition | $T_{PSS/SSS\_sync\_intra\_NR\_U}$ |
|---|---|
| No DRX | max(600 ms, ceil((5 + $L_{PSS/SSS}$) × $K_p$) × DMTC period) × $CSSF_{intra}$ |
| DRX cycles <= 320 ms | max(600 ms, ceil(1.5 × (5 + $L_{PSS/SSS}$) × $K_p$) × max(DMTC period, DRX cycle)) × $CSSF_{intra}$ |
| DRX cycle > 320 ms | ceil((5 + $L_{PSS/SSS}$) × $K_p$) × DRX cycle × $CSSF_{intra}$ |

The second table illustrates the time for intrafrequency cell detection of a deactivated secondary cell (SCell).

| Condition | (for deactivated SCell) $T_{PSS/SSS\_sync\_intra\_NR\_U}$ |
|---|---|
| No DRX | (5 + $L_{PSS/SSS}$) × measCycleSCell × $CSSF_{intra}$ |
| DRX cycles <= 320 ms | (5 + $L_{PSS/SSS}$) × max(measCycleSCell, 1.5×DRX cycle) × $CSSF_{intra}$ |
| DRX cycle > 320 ms | (5 + $L_{PSS/SSS}$) × max(measCycleSCell, DRX cycle) × $CSSF_{intra}$ |

The third table illustrates the time for intrafrequency measurements.

| Condition | $T_{SSB\_measurement\_period\_intra\_NR\_U}$ |
|---|---|
| No DRX | max(200 ms, ceil((5 + $L_{meas}$) × $K_p$) × DMTC period) × $CSSF_{intra}$ |
| DRX cycles <= 320 ms | max(200 ms, ceil(1.5 × (5 + $L_{meas}$) × $K_p$) × max(DMTC period, DRX cycle)) × $CSSF_{intra}$ |
| DRX cycle > 320 ms | ceil((5 + $L_{meas}$) × $K_p$) × DRX cycle × $CSSF_{intra}$ |

The fourth table illustrates the time for interfrequency cell detection.

| Condition | $T_{PSS/SSS\_sync\_inter\_NR\_U}$ |
|---|---|
| No DRX | max(600 ms, (8 + $L_{PSS/SSS}$) × max(MGRP, DMTC period)) × $CSSF_{inter}$ |
| DRX cycles <= 320 ms | max(600 ms, ceil((8 + $L_{PSS/SSS}$) × 1.5) × max(MGRP, DMTC period, DRX cycle)) × CSSFinter |
| DRX cycle > 320 ms | (8 + $L_{PSS/SSS}$) × DRX cycle × $CSSF_{inter}$ |

The fifth table illustrates the time for interfrequency measurements.

| Condition | $T_{SSB\_measurement\_period\_inter\_NR\_U}$ |
|---|---|
| No DRX | max(200 ms, (8 + $L_{meas}$) × max(MGRP, DMTC period)) × $CSSF_{inter}$ |
| DRX cycles <= 320 ms | max(200 ms, ceil((8 + $L_{meas}$) × 1.5) × max(MGRP, DMTC period, DRX cycle)) × $CSSF_{inter}$ |
| DRX cycle > 320 ms | (8 + $L_{meas}$) × DRX cycle × $CSSF_{inter}$ |

In some embodiments, in a radio resource control (RRC) connected mode (e.g., RRC_connected) serving cell evaluation may proceed as follows. Upon exceeding a threshold number (such as, for example, a maximum number) of missed reference signal opportunities due to downlink (DL) LBT failures, (e.g., L) over the corresponding period of time, (e.g., T) the UE may restart the corresponding procedure, e.g., time index detection and measurements. In other words, after L missed reference signal opportunities within time T, the UE may restart the physical layer procedure of detecting reference signals above a noise threshold.

In some embodiments, in an idle mode (e.g., RRC_IDLE mode), serving cell evaluation may be different than in a connected mode. For example, a UE may initiate measurements of neighbor cells indicated by the serving cell if it is unable to measure on the serving cell for at least a number (Mp) of consecutive DRX cycles not available at the UE (e.g., due to DL LBT failures). Further, the UE may initiate the measurements on neighbor cells other than those indicated by the serving cell (e.g., of any intra-frequency or inter-frequency) if it is unable to measure the serving cell during at least a second number (Mq) of consecutive DRX cycles. Such measurements of other cells may be triggered when Mq is reached regardless of any condition of signal quality or signal strength of the serving cell (e.g., SnonIntraSearchP and/or SnonIntraSearchQ). The values of Mp and Mq may have a variety of possible values, as desired. One set of exemplary values of these parameters may be: Mp=4 when DRX cycle length <1.28 s, Mp=2 when DRX cycle length ≥1.28 s, Mq=8 when DRX cycle length <1.28 sec, and Mq=4 when DRX cycle length ≥1.28 sec.

Under some circumstances, a UE restarting serving cell measurement after reaching or exceeding the threshold acceptable number of DL LBT failures over the corresponding period of time may be a problem for mobility performance. Such behavior may eventually cause RLF (radio link failure). For example, a long LBT failure (e.g., preventing a number of reference signal transmissions) may occur at the serving cell. A UE may continue doing serving cell measurement without triggering any neighbor cell measurement for handover. Thus, the UE may perform radio link monitoring on the serving cell, and (e.g., after a long evaluation period) may claim RLF because no handover condition has been reached during this period. After RLF, the UE may need to do RRC reestablishment, resulting in a further delay for UE to recover the RRC link and further degradation of both the mobility performance and capacity of network.

FIG. 8 is a flow chart diagram illustrating an example method of cell detection and measurement. Aspects of the method of FIG. 8 may be implemented by a UE 106 in communication with a cellular network (e.g., via one or more BS 102), as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.), may cause the UE, base station, and/or network element(s) to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may establish a connection with a cellular network via one or more BS 102 (802), according to some embodiments. Among various possibilities, the connection may operate according to 5G NR. The UE and network may communicate using NR unlicensed. The UE and network may also communicate using NR licensed and/or other RATs. The UE and network may exchange control information and/or application data in the UL and/or DL directions.

The UE may communicate with one or more cells of the network, e.g., a serving cell or group of serving cells such as a primary cell (PCell) and one or more secondary cells (SCell). The PCell and any SCell(s) may be provided by the same and/or different BS 102. As one possible example, a PCell may use licensed spectrum and an SCell may use unlicensed spectrum.

The UE may monitor reference signals provided by the serving cell(s), such as PSS, SSS, and/or SSB. In addition to the serving cell(s), the UE may monitor reference signals such as PSS, SSS, and/or SSB of one or more neighbor cells. The neighbor cell(s) may be provided by the same and/or different BS 102 as the serving cell(s).

The network may provide control information to the UE regarding monitoring of reference signals. For example, the network may indicate to the UE one or more cells (e.g., measurement objects (MO) or frequencies) for the UE to monitor under various conditions.

The UE may use the reference signals of the serving and/or neighbor cell(s) for various purposes, including synchronization with the network, determination of frequencies of the cell(s), and/or measurements of channel characteristics (e.g., signal strength, etc.) of the cell(s). Further, the UE may perform actions such as handover and/or reselection based on measurements of the reference signals.

The UE 106 may detect one or more missed reference signal opportunity (804), according to some embodiments. The missed reference signal opportunity or opportunities may be an SSB (e.g., containing PSS and/or SSS) which is not transmitted by the BS 102 due to LBT failure. For example, a BS 102 may not transmit the reference signal(s) at the scheduled opportunity due to transmission activity or other interference on an unlicensed medium (e.g., the NR-unlicensed medium). An example of such transmission activity may be a WLAN transmission, among various possibilities. Thus, the UE may determine that DL reference signals such as PSS, SSS, and/or SSB are not received at one or more occasions for such DL reference signals. The DL reference signals missed may be (e.g., expected to be) from a BS 102 of a serving cell or a neighbor cell. The UE may or may not detect a transmission or interference that caused the BS to skip the reference signal transmission, e.g., due to the BS's LBT process.

The UE 106 may track missed reference signal opportunities over time. Such tracking may be performed on a per cell (e.g., per frequency and/or per measurement object (MO)) basis. For example, the UE may track the number of reference signal opportunities missed by a serving cell separately from a neighbor cell. Similarly, the UE may track the number of opportunities missed by a first neighbor (or serving) cell separately from a second neighbor (or serving) cell, etc. For example, a UE may track missed reference cell opportunities for one or more target cells, MOs, or frequencies, and determine whether a number of missed opportunities for any of the target cells, MOs, or frequencies reaches a corresponding threshold. Such thresholds may be specific to the target. In other words, different thresholds may be used for different types of targets, e.g., serving cells vs. neighbor cells, etc. For example, the UE may determine that a number of missed reference signal opportunities meets (e.g., exceeds) a threshold within a specified period of time (e.g., T). The threshold number of opportunities and the period of time may be configured as desired. In some embodiments, a threshold number of consecutive missed reference signal opportunities may be used, e.g., the UE may determine whether a number of consecutive missed opportunities exceeds a threshold. Similarly, the UE may determine whether an amount of time since a last reference signal has been received reaches a threshold amount of time. For example, a timer or counter may be reset (e.g., set to zero) each time a reference signal (e.g., of a target MO) is detected.

Thus, the UE may monitor one or more threshold conditions for determining that reference signals of a target cell have not been received sufficiently recently, e.g., conditions indicating that traffic on an unlicensed medium are preventing the target cell from providing reference signals to a degree that interferes with the UE's detection/measurement of the cell. Such a threshold condition may be a threshold for a number of missed opportunities (e.g., consecutive or over a period of time) or a period of time since a last reference signal was successfully received. Such threshold conditions may be configured by RRC or other signaling from the network. Such threshold conditions may be configured for a particular target cell (e.g., frequency, MO, etc.). In other words, different threshold conditions may be configured for different cells. For example, the network may consider different cells to be associated with different priorities, and may configure different threshold conditions accordingly.

In some embodiments, any of the various thresholds for determining that a threshold condition is reached may be dynamic, e.g., the threshold level may vary over time based on changing conditions. In other words, the UE may change a threshold level based on factors such as past experience with one or more cells, measurements of radio link conditions, applications executing at the UE, quality of service considerations, etc. Further, the network may signal to the UE to adjust such thresholds over time, e.g., based on changing traffic/load conditions at one or more base stations or other network elements, etc.

In response to determining that a threshold condition has been reached, the UE 106 may modify reference signal monitoring (806), according to some embodiments. The UE may modify monitoring of neighbor cells in response to a neighbor cell reaching a threshold condition and/or may modify monitoring of serving cells and/or neighbor cells in response to a serving cell reaching a threshold condition. Such modifications may take various forms as described below.

As a first example, in response to determining that a threshold condition applicable to a particular neighbor cell has been reached, the UE may discontinue monitoring that neighbor cell and may begin monitoring one or more different neighbor cells. Thus, upon reaching a threshold condition (e.g., exceeding the threshold acceptable number of DL LBT failures over the PSS/SSS detection, identification, synchronization period of time), the UE may stop the PSS/SSS detection, identification, synchronization or cell identification on that target unlicensed frequency layer (e.g., target cell). In other words, the UE may discontinue monitoring reference signal opportunities of the cell for which the threshold number of missed opportunities has been reached.

In some embodiments of the first example, the UE may continue the PSS/SSS detection, identification, synchronization or cell identification on that target unlicensed frequency layer until an internal timer has expired. In other words, the UE may maintain a timer internally to decide if the PSS/SSS detection, identification, synchronization or cell identification on that target unlicensed frequency layer should be stopped. Such a timer may provide additional time for the UE to detect a reference signal from the target cell. Thus, such a timer may be started upon a determination that a threshold condition is reached (e.g., a threshold number of missed reference signal opportunities). This timer may be configured by the network, or, this timer may be controlled or generated by UE itself. For example, UE may determine the duration of the timer, the network may configure the duration of the timer (e.g., in 802), or the duration of the timer may be set in a technical standard. In the event that the internal timer has expired and no further reference signal is received from the target cell, the UE may discontinue monitoring the reference signals of the particular neighbor cell, and may proceed to modify the monitoring of other reference signals as described below.

Further, the UE may alert the network that the threshold condition has been reached. For example, the UE may indicate this PSS/SSS detection, identification, synchronization failure to network. In other words, the UE may indicate to the serving cell that the threshold condition was reached for the target cell (e.g., a neighbor cell) and may provide details about the threshold condition. For example, the UE may indicate the failure to the network by using RRC signaling, e.g., transmitted via a serving cell. The RRC signaling may indicate the synchronization detection failure (e.g., failure to detect reference signals) for the configured target cell, e.g., indicated by measurement object (MO) and/or configured carrier frequency, among various possibilities.

Further, the UE may switch to another carrier frequency for new PSS/SSS detection/identification/synchronization. In other words, the UE may begin monitoring reference signal opportunities associated with a second target cell, e.g., a different neighbor cell. The second neighbor cell may operate according to NR-U, among various possibilities. For example, the UE may switch to a pre-configured carrier frequency (e.g., target cell) if the network previously configured such a target (e.g., in 802). Alternatively, e.g., if the network did not previously configure any other carrier frequency for cell detection, the UE may either choose to switch to a carrier frequency which is decided by UE itself or wait for further control information or configuration from network (e.g., transmitted by RRC, media access control (MAC) control element (CE), etc.). Such further control information may identify the new carrier frequency or MO.

In some embodiments, the first example may apply to a UE operating in an idle mode (e.g., RRC_IDLE). In other words, the UE may be in an idle mode while monitoring reference signals of a first target cell, and may remain in the idle mode after detecting the threshold condition and switching to monitor reference signals of a second target cell.

As a second example, consider a UE performing serving cell measurement in a connected mode (e.g., RRC_CONNECTED). Upon reaching a threshold condition for the serving cell, (e.g., exceeding the threshold acceptable number of DL LBT failures over a corresponding period of time), the UE may restart the serving cell measurement, and also modify neighbor cell measurements.

For example, if the network previously configured MOs for intra-frequency or inter-frequency carriers (e.g., in 802), the UE may initiate measurements of neighbor cells configured by the serving cell. In other words, the UE may begin (e.g., or increase) monitoring reference signals of a neighbor cell and performing measurements of those reference signals. In some embodiments, the UE may only initiate the neighbor cell measurements if it is unable to measure reference signals of a serving cell for at least a number (Y1) of (e.g., consecutive) SSB occasions (e.g., containing PSS and/or SSS), among other possibilities. Note that the value of Y1 can be same or different from a threshold used to determine the threshold condition (e.g., in 804). Further, the UE may initiate the measurements on neighbor cells of other cells (e.g., cells not previously configured by the network, e.g., any intra-frequency or inter-frequency cell(s)) if it is unable to measure reference signals of a serving cell during at least a second number (Y2) of (e.g., consecutive) reference signal occasions. In some embodiments, such measurement of additional neighbor cells may be performed regardless of any MO configurations from network. In other words, after the second threshold (Y2) is reached, the UE may select one or more other neighbor cells for measurement/monitoring from any number of possible neighbor cells. Note that Y2 may be greater than or equal to Y1.

Similarly, if network did not configure MOs for intra-frequency or inter-frequency carriers before, the UE may initiate the monitoring and measurements on neighbor cells of any intra-frequency or inter-frequency if it is unable to measure reference signals of a serving cell during at least a third number (Z) of (e.g., consecutive) reference signal occasions. Y1, Y2, and Z may be configured by the UE and/or network (e.g., in control information during 802) as desired.

In some embodiments, the monitoring modifications may include initiating monitoring of previously unmonitored cells (e.g., MOs). In some embodiments, the monitoring modifications may include adjusting the relative priority of monitoring one cell over another.

Based on the monitoring modifications (e.g., determined in 806), the UE 106 may implement a modified monitoring pattern (808), according to some embodiments.

For example, the UE may monitor one or more different neighbor cells. The monitored neighbor cells may be candidate cells for handover. Accordingly, by updating/modifying the neighbor cell or list of neighbor cells, an RRC_CONNECTED mode UE may improve the likelihood of a successful handover, if a handover event is triggered. For example, at a first time, an RRC_CONNECTED mode UE may detect that a threshold condition is reached for a first neighbor cell, e.g., due to a number of missed reference signal opportunities reaching a threshold, e.g., as in 804. In response, the UE may stop monitoring the first neighbor cell and start monitoring and measuring a second neighbor cell, e.g., as in 806. Then, at a second time, the UE may handover from a current serving cell to the second neighbor cell based in part on monitoring the second neighbor cell.

Further, a UE may take measurements of the monitored reference signals. The UE may report measurements based on the monitored reference signals to the network (e.g., by providing channel state information reports, etc.). The UE may perform handover or reselection based on measurements of the monitored reference signals. For example, if a serving cell reaches a threshold number of LBT failures (e.g., Y1 or Y2 missed reference signal opportunities), the UE may begin monitoring a neighbor cell as described above, and may reselect to such a neighbor cell if measurements of the monitored reference signals of that neighbor cell meet a threshold (e.g., sufficiently high signal strength, etc.).

Additional Information and Examples

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a user equipment device (UE) to:
   establish communication with a serving cell of a cellular network;
   receive, from the serving cell, control information regarding monitoring reference signals of a first neighbor cell on a first frequency carrier operating in unlicensed spectrum;
   monitor reference signals of the first neighbor cell on the first frequency carrier in the unlicensed spectrum according to the control information, wherein to perform said monitoring includes:
      determining that a first reference signal of the first neighbor cell on the first frequency carrier in the unlicensed spectrum is not received at a first opportunity;
      starting a timer in response to the determination; and
      determining that no further reference signal of the first neighbor cell on the first frequency carrier is received in the unlicensed spectrum prior to expiration of the timer; and
   in response to the determination that no reference signal of the first neighbor cell on the first frequency carrier is received in the unlicensed spectrum prior to expiration of the timer:
      stop monitoring the reference signals of the first neighbor cell on the first frequency carrier in the unlicensed spectrum; and
      start monitoring reference signals of a second neighbor cell on a second frequency carrier in the unlicensed spectrum.

2. The apparatus of claim 1, wherein the second neighbor cell on the second frequency carrier is identified by the control information.

3. The apparatus of claim 1, wherein the processor is further configured to cause the UE to monitor the second neighbor cell on the second frequency carrier.

4. The apparatus of claim 1, wherein the processor is further configured to cause the UE to indicate to the network that no further reference signal of the first neighbor cell on the first frequency carrier is received prior to expiration of the timer.

5. The apparatus of claim 4, wherein the processor is further configured to cause the UE to receive, from the serving cell, second control information identifying the second neighbor cell on the second frequency carrier.

6. The apparatus of claim 1, wherein the UE operates in a connected mode while monitoring the reference signals of the first neighbor cell on the first frequency carrier and while monitoring the reference signals of the second neighbor cell on the second frequency carrier.

7. The apparatus of claim 1, wherein the first reference signal of the first neighbor cell on the first frequency carrier is not transmitted at the first opportunity due to another transmission on the unlicensed spectrum.

8. A method, comprising:
   communicate with a serving cell of a cellular network;
   receive, from the serving cell, control information regarding monitoring reference signals of a first neighbor cell on a first frequency carrier operating in unlicensed spectrum;
   monitor reference signals of the first neighbor cell on the first frequency carrier in the unlicensed spectrum according to the control information, wherein to perform said monitoring includes:
      determining that a first reference signal of the first neighbor cell on the first frequency carrier in the unlicensed spectrum is not received at a first opportunity;
      starting a timer in response to the determination; and
      determining that no further reference signal of the first neighbor cell on the first frequency carrier is received in the unlicensed spectrum prior to expiration of the timer; and
   in response to the determination that no reference signal of the first neighbor cell on the first frequency carrier is received in the unlicensed spectrum prior to expiration of the timer:
      stop monitoring the reference signals of the first neighbor cell on the first frequency carrier in the unlicensed spectrum; and
      start monitoring reference signals of a second neighbor cell on a second frequency carrier in the unlicensed spectrum.

9. The method of claim 8, wherein the second neighbor cell on the second frequency carrier is identified by the control information.

10. The method of claim 8, further comprising:
monitor the second neighbor cell on the second frequency carrier.

11. The method of claim 8, further comprising:
indicate to the network that no further reference signal of the first neighbor cell on the first frequency carrier is received prior to expiration of the timer.

12. The method of claim 11, further comprising:
receive, from the serving cell, second control information identifying the second neighbor cell on the second frequency carrier.

13. The method of claim 8, wherein a user equipment operates in a connected mode while monitoring the reference signals of the first neighbor cell on the first frequency carrier and while monitoring the reference signals of the second neighbor cell on the second frequency carrier.

14. The method of claim 8, wherein the first reference signal of the first neighbor cell on the first frequency carrier is not transmitted at the first opportunity due to another transmission on the unlicensed spectrum.

15. A user equipment device (UE), comprising:
a radio; and
a processor operably coupled to the radio, wherein the radio and the processor are configured to:
communicate with a serving cell of a cellular network;
receive, from the serving cell, control information regarding monitoring reference signals of a first neighbor cell on a first frequency carrier operating in unlicensed spectrum;
monitor reference signals of the first neighbor cell on the first frequency carrier in the unlicensed spectrum according to the control information, wherein to perform said monitoring includes:
determining that a first reference signal of the first neighbor cell on the first frequency carrier in the unlicensed spectrum is not received at a first opportunity;
starting a timer in response to the determination; and
determining that no further reference signal of the first neighbor cell on the first frequency carrier is received in the unlicensed spectrum prior to expiration of the timer; and
in response to the determination that no reference signal of the first neighbor cell on the first frequency carrier is received in the unlicensed spectrum prior to expiration of the timer:
stop monitoring the reference signals of the first neighbor cell on the first frequency carrier in the unlicensed spectrum; and
start monitoring reference signals of a second neighbor cell on a second frequency carrier in the unlicensed spectrum.

16. The UE of claim 15, wherein the second neighbor cell on the second frequency carrier is identified by the control information.

17. The UE of claim 15, wherein the processor is further configured to cause the UE to monitor the second neighbor cell on the second frequency carrier.

18. The UE of claim 15, wherein the processor is further configured to cause the UE to indicate to the network that no further reference signal of the first neighbor cell on the first frequency carrier is received prior to expiration of the timer.

19. The UE of claim 18, wherein the processor is further configured to cause the UE to receive, from the serving cell, second control information identifying the second neighbor cell on the second frequency carrier.

20. The UE of claim 15, wherein the UE operates in a connected mode while monitoring the reference signals of the first neighbor cell on the first frequency carrier and while monitoring the reference signals of the second neighbor cell on the second frequency carrier.

* * * * *